United States Patent

Meyerson et al.

[19]

[11] Patent Number: 5,818,023
[45] Date of Patent: Oct. 6, 1998

[54] PORTABLE ID CARD VERIFICATION APPARATUS

[75] Inventors: Robert F. Meyerson, Akron, Ohio; Ynjiun P. Wang, Fort Myers, Fla.; Timothy P. O'Hagan, Akron, Ohio

[73] Assignee: Metanetics Corporation, Fort Myers, Fla.

[21] Appl. No.: 611,126

[22] Filed: Mar. 5, 1996

Related U.S. Application Data

[63] Continuation-in-part of Ser. No. 596,947, Feb. 5, 1996, Pat. No. 5,718,028.

[51] Int. Cl.$^6$ ........................................................ G06K 7/10
[52] U.S. Cl. ........................................... 235/462; 235/470
[58] Field of Search ................................... 235/375, 380, 235/382, 382.5, 462, 470, 467

[56] References Cited

U.S. PATENT DOCUMENTS

| | | |
|---|---|---|
| 3,654,435 | 4/1972 | Vaccaro . |
| 3,676,644 | 7/1972 | Vaccaro et al. . |
| 3,924,105 | 12/1975 | Gassino et al. . |
| 4,174,890 | 11/1979 | Johnson et al. ..................... 235/463 X |
| 4,811,408 | 3/1989 | Goldman . |
| 5,024,619 | 6/1991 | Hammond, Jr. . |
| 5,095,196 | 3/1992 | Miyata ....................................... 235/382 |
| 5,396,054 | 3/1995 | Krichever et al. ...................... 235/462 |
| 5,422,470 | 6/1995 | Kubo ....................................... 235/462 |
| 5,430,283 | 7/1995 | Tanaka ................................... 235/462 |
| 5,469,506 | 11/1995 | Berson et al. ....................... 235/380 X |
| 5,550,359 | 8/1996 | Bennett ................................. 235/382 |

*Primary Examiner*—Donald T. Hajec
*Assistant Examiner*—Karl Frech
*Attorney, Agent, or Firm*—Watts, Hoffman, Fisher & Heinke Co., LPA

[57] ABSTRACT

A portable ID card verification apparatus is disclosed. The apparatus includes a housing defining an interior region supporting electrical circuitry including a processor. A two dimensional imaging assembly is at least partially enclosed within the housing. A display screen in electrically coupled to the imaging assembly. An upper surface of the housing supports a glass window on which an ID card is positioned for reading a dataform imprinted thereon. The dataform includes a compressed digitized representation of an attribute of the authorized card holder, such as a photograph of the card holder. The imaging assembly images and decodes the 2D dataform on the ID card and the processor in conjunction with display driver circuitry causes an image of the card holder's photograph to be displayed on the display screen.

4 Claims, 8 Drawing Sheets

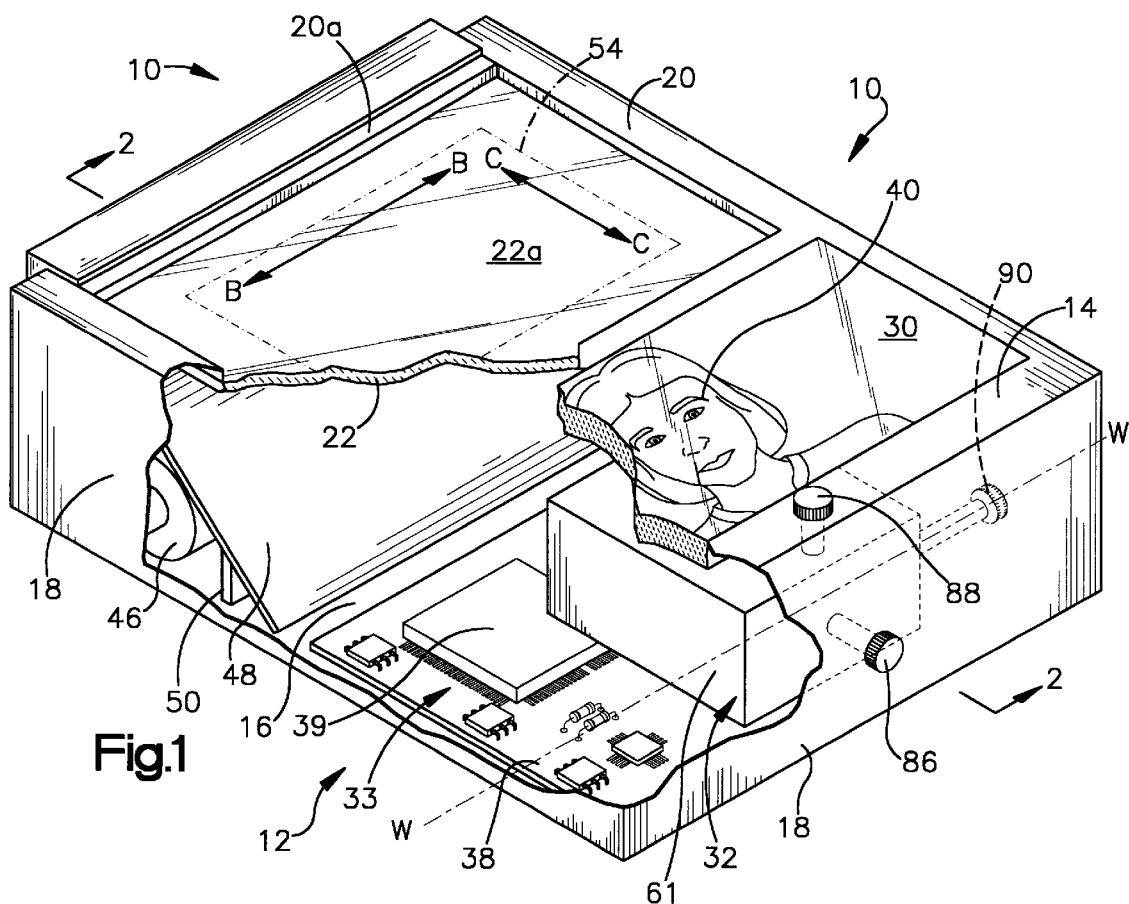
Fig.1
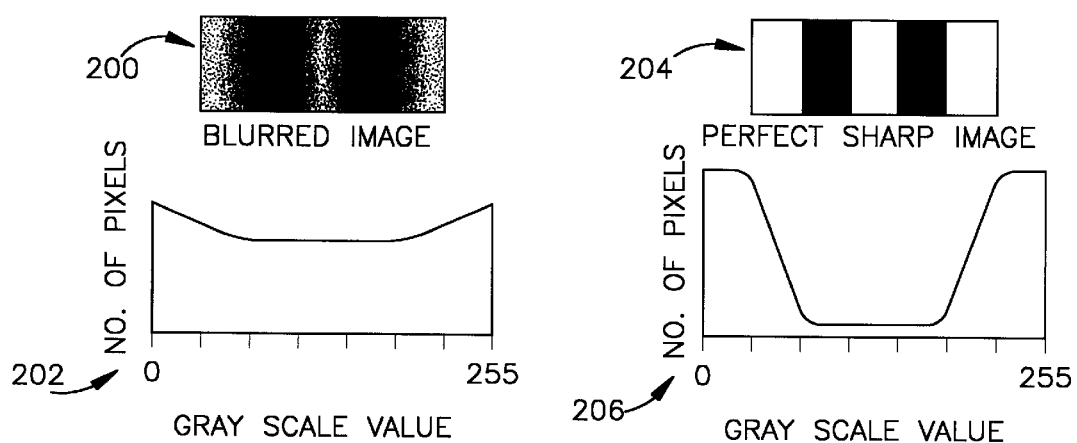
Fig.5A
Fig.5B

SIGNAL REPRESENTATIVE
OF GRAY SCALE VALUE

SIGNAL REPRESENTATIVE
OF GRAY SCALE VALUE

PORTABLE ID CARD VERIFICATION APPARATUS

CROSS REFERENCE TO RELATED APPLICATIONS

This application is a continuation-in-part of patent application Ser. No. 08/596,947, filed Feb. 5, 1996, now U.S. Pat. No. 5,718,028 entitled "Automatic Data Translation Between Different Business Systems." application Ser. No. 08/596,947 is incorporated herein in its entirety by reference.

FIELD OF THE INVENTION

This invention relates to a portable identification card (ID card) verification apparatus and, more particularly, to a portable ID card verification apparatus including a two dimensional photosensor array imaging assembly for imaging and decoding a two dimensional dataform imprinted on a surface of the ID card and a display screen for displaying an image of a decoded digitized representation of an attribute of the authorized card holder such as a photograph or a signature.

BACKGROUND

In an effort to reduce unauthorized use of lost or stolen identification cards (ID cards) such as driver's licenses, credit cards, automatic teller bank cards, etc., many card issuers include a photograph of the authorized card holder on a portion of a front of the ID card. While the inclusion of a photograph of the card holder has proven to be a useful deterrent to unauthorized use of lost or stolen ID cards, a thief may modify a lost or stolen ID card by "cutting and pasting" a replacement photograph over the card holder's photograph so that the card may be used by the thief or an accomplice. Alternatively, a thief, using a state of the art color copying machine and a laminating machine, may produce an accurate color copy of a lost or stolen ID card with a photograph of the thief or an accomplice in place of the card holder's photograph.

One possible solution to this problem would be to imprint a dataform on a surface of an ID card wherein the dataform includes an encoded digitized representation of the card holder's photograph. When the ID card is presented to an attendant for use, the dataform imprinted on the ID card would be decoded and an image of the card holder displayed on a display screen. The attendant would compare the display with the photograph on the front of the ID card to verify that the ID card has not been modified.

Encrypting the digitized photograph using an encrypting algorithm prior to encoding the representation in a dataform would increase the difficulty of a thief attempting to create a "bogus" card by generating a 2D dataform corresponding to a photograph of the thief or an accomplice. In other words, even if a thief had access to a digitizer to digitize a photograph of himself or an accomplice and further had dataform encoding circuitry to encode the digitized representation of the photograph in the appropriate dataform format, he would still need to know the encryption algorithm to successfully fabricate a "bogus" ID card whose photograph matched the image resulting from decoding the dataform.

What is needed is a portable ID card verification apparatus adapted to read and decode a dataform imprinted on an ID card and display an image of the card holder where a digitized encrypted representation of a photograph of the card holder is encoded in the dataform.

Conventional one dimensional (1D) bar code dataforms such as the ubiquitous 1D universal product code (UPC) bar code dataform, in which data is encoded in one horizontal row of alternating dark bars and light colored blank spaces of varying widths, does not provide a sufficient density of encoded data to encode a digitized representation of a photograph within a surface area available on the back of a normal wallet sized ID card.

Two dimensional (2D) bar code dataforms provide a much greater density of encoded data and would permit a digitized representation of a photograph to be encoded on the back of an ID card. Stacked bar codes and matrix codes are two types of 2D dataforms suitable for encoding a digitized representation of a photograph in a portion of a front or back surface of a normal wallet-sized ID card. A stacked 2D bar code dataform includes a plurality of horizontal rows of alternating dark colored bars and blank spaces. Examples of stacked 2D bar code dataforms include PDF-417 and Supercode. A matrix code dataform includes a two dimensional hexagonal or square matrix of positions which are shaded either dark or light. Examples of matrix code dataforms include MaxiCode, Data Matrix and Code 1. Such a 2D dataform imprinted on a portion of a front or back surface of a normal wallet-size ID card provides sufficient encoded data capacity to store a compressed digital image representation of a photograph of the card holder.

Stacked bar code dataforms can be read using a hand held laser scanner dataform reader because such a dataform includes vertical synchronization patterns. A problem associated with reading 2D stacked bar code dataforms with a laser scanner is that a significant period of time is required to either manually or automatically raster the laser beam over the entire dataform.

Dataform readers utilizing a 1D charge coupled device (CCD) imaging assembly including a linear photosensor array are also capable of reading 2D stacked bar code dataforms. Again, a significant period of time is required to move the dataform reader vertically to read the dataform.

More recently, dataform readers having 2D photosensor arrays have been developed which capture an image of a 2D dataform for decoding. Such 2D dataform readers are capable of reading both 2D stacked bar codes and matrix codes. A problem associated with such 2D imaging assembly dataform readers is that the quantity of photosensors or pixels in the photosensor array limits the size and resolution of the dataform that can be read. Note that a pixel or picture element is the smallest addressable segment, in terms of X and Y segments, on a photosensor array. Each photosensor corresponds to a pixel and the terms "photosensor" and "pixel" are used interchangeably throughout this documents.

Traditional sampling theory holds that the smallest dataform element must be imaged onto at least two pixels for proper decoding of the dataform by decoding circuitry in the dataform reader. Typical 2D photosensor arrays comprise a 752 by 582 photosensor or pixel matrix. Thus, there are only 752 pixels in each horizontal row, which is considerably less than a row of 2048 pixels typically included in a linear 1D photosensor array. Reading a dataform with a 2D photosensor array imaging assembly requires imaging the dataform on the 2D photosensor array such that the dataform's perimeter is within the perimeter of the photosensor array. This is a difficult task to accomplish with a hand held dataform reader because of normal unsteadiness of an operator's hand while the reader is aimed at a target dataform and actuated to read a dataform.

What is needed is an ID card verification apparatus including a 2D photosensor array imaging dataform reader and a display screen supported by a housing to provide inexpensive and timely verification of a photograph ID card, specifically, to verify that a photograph on an ID card corresponds to a digitized representation of a photograph of the authorized card holder encoded in a 2D dataform imprinted on the card.

Such an ID card verification apparatus could be advantageously employed in other situations, for example, in a bank or check cashing facility to verify that a drawer's signature on a check corresponds to the signature of an authorized drawer on the account. In this situation, a 2D dataform is printed on each check. The dataform includes a compressed digital image of the signature of the authorized drawer or drawers on the account. When a check is tendered for cashing, the 2D dataform is decoded and an image of the authorized drawer's signature would be displayed on the display screen. The teller would compare the displayed signature or signatures with the drawer's signature on the check. If the drawer's signature on the check matches the display signature, then the check signature is authentic. U.S. Pat. No. 5,490,217 issued Feb. 6, 1996 and entitled "Automatic Document Handling System" is incorporated herein in its entirety by reference.

SUMMARY OF THE INVENTION

The present invention relates to a portable verification apparatus. The apparatus reads a 2D dataform imprinted on an item and displays an image of a digitized representation of an attribute of an authorized user of the item encoded in the dataform. The verification apparatus includes a housing at least partially enclosing an imaging assembly including a camera assembly having a 2D photosensor array. The housing encloses electronic circuitry including a processor electrically coupled to the imaging assembly. The imaging assembly comprises a camera module including the camera assembly, an illumination assembly and an optic assembly having a plurality of lenses for focusing an image onto the 2D photosensor array. The housing further supports a liquid crystal display screen and display driver circuitry which is electrically coupled to the display screen and to dataform decoding circuitry of the imaging assembly.

The housing includes an opening overlied by a support surface comprising a substantially transparent window, preferably a glass window. An item having a 2D dataform is placed on the transparent window so that the dataform is visible through the window. An image of the dataform is focused by the optic assembly onto the 2D photosensor array. A composite video signal is generated by the camera module and electrically coupled to image processing and decoding circuitry which decodes the 2D dataform. The microprocessor selects data corresponding to the digitized representation of the decoded attribute of the authorized card holder and transmits the data to the display driver circuitry. The display driver circuitry properly formats the data and causes it to be displayed as an image on the liquid crystal display screen.

The optic assembly positioned between the photosensor array and the transparent window and is adjustable along an axis perpendicular to a surface of the photosensor array. The adjustability of the optic assembly permits a sharp image of the 2D dataform to be properly focused onto the surface of the photosensor array. Further, the camera module is adjustable in three dimensions with respect to the housing and the transparent window so that as large an image as possible of the item's dataform is focused onto the 2D photosensor array without exceeding the bounds of the outer perimeter of the array.

The verification apparatus further includes focusing circuitry to aid an operator of the apparatus in adjusting the optic assembly upon initialization of the apparatus. The focusing circuitry analyzes the sharpness of the image projected onto the 2D photosensor array by determining a shape of a histogram of gray scale values of a sample of pixels of the photosensor array. The focusing circuitry coacts with the display driver circuitry to illuminate one of two prompts on the display screen—one prompt denoted "worse" and the other prompt denoted "sharper".

If the user is moving the optic assembly in a direction which is causing the image projected on the photosensor array to become sharper or more well defined, the "sharper" prompt will be illuminated. If, on the other hand, the user is moving the optic assembly in a direction which is causing the image projected on the photosensor array to become more blurred, the "worse" prompt will be illuminated.

The imaging assembly further includes signal processing circuitry which permits sub-pixel interpretation of bar code elements which are projected onto less than two photosensors or pixels of the 2D photosensor array. Additionally, the imaging assembly includes decoding circuitry for decoding the item's 2D dataform. The verification apparatus further includes a display screen supported by the housing and electronically coupled to the imaging assembly for displaying a digital representation of the decoded attribute of the authorized user.

The housing may advantageously support a mirror between the optic assembly and the support surface to reduce the size of the apparatus by permitting the dataform imaging assembly to be mounted perpendicularly to the support surface. Preferably, the display screen is a liquid crystal display screen. The illumination assembly includes a printed circuit board supporting a plurality of surface mount LEDs and a spaced apart lens array to direct illumination of the LEDs onto a target area defined by the field of view of the camera assembly.

These and other objects, advantages and features of the invention will become better understood from a detailed description of a preferred embodiment of the invention which is described in conjunction with the accompanying drawings.

BRIEF DESCRIPTION OF THE DRAWINGS

FIG. 1 is a cut away perspective view of a portable identification card (ID) verification apparatus the present invention;

FIG. 5A is a representative histogram plotting an output gray scale values of a captured field of image data versus number of pixels for a "blurred" image bar code dataform image frame;

FIG. 5B is a representative histogram plotting an output gray scale values of a captured field of image data versus number of pixels for a "sharp" image bar code dataform image frame;

DETAILED DESCRIPTION

Figure 2:
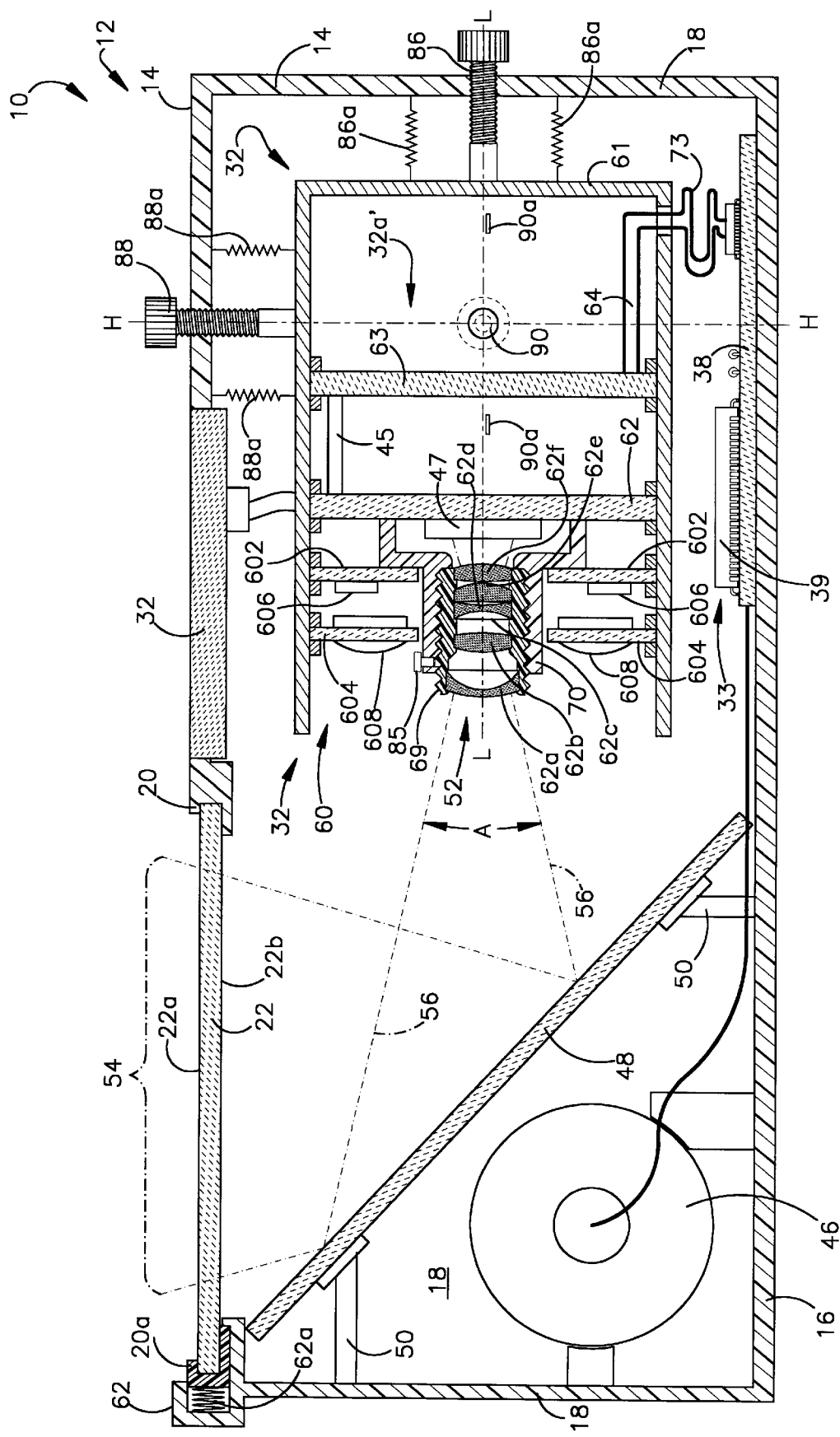
FIG. 2 is a section view of the portable ID verification apparatus of FIG. 1 as seen from a plane indicated by the line 2—2 in FIG. 1.

Turning to the drawings, a portable identification card (ID card) verification apparatus is generally shown at 10 in FIG. 1. The verification apparatus 10 includes a housing 12 with an upper surface 14, lower surface 16 and four sides 18 forming an interior region. The upper surface 14 includes an aperture defined by a perimeter bezel 20. The bezel 20 supports a transparent material 22 such as glass window or other suitable transparent material. The glass 22 forms a light transmissive window into the housing interior region. The housing upper surface 14 also supports a liquid crystal display screen 30.

A camera module 32, discussed in more detail later, is supported in the housing interior region and functions with imaging circuitry 33 mounted on a control and decoder board 38 to capture an image of a target area 54 which coincides with an upper surface 22a of the glass window 22. The camera module 32 and the control and decoder board 38 and the imaging circuitry supported thereon comprise an imaging assembly of the verification apparatus 10.

The control and decoder board 38, also supported in the housing interior region, is electrically coupled to the camera module 32 and the display screen 30. The control and decoder board 38 includes a microprocessor 39 and suitable circuitry (including memory for code executable by the microprocessor 39) for controlling the camera module 32 the image capture process, decoding a 2D dataform, decrypting the decoded dataform data, if the data encoded in the dataform was encrypted, and displaying a representation of the decoded and decrypted data on the display screen 30.

A battery 46 (or other suitable power source) is supported in the housing interior region and is electrically coupled to the control and decoder board 38 for providing power to the imaging circuitry 33, the camera module 32 and the display screen 30. A mirror 48 is fixedly positioned in the housing interior region by supports 50 extending from inner walls of the housing 12. The mirror 48 is positioned to fold the optical path between the glass window upper surface 22a and an optic assembly 52 of the camera module 32. This enables the verification apparatus 10 to be compact because the camera module 32 is mounted orthogonally to the glass window upper surface 22a.

Figure 13A:
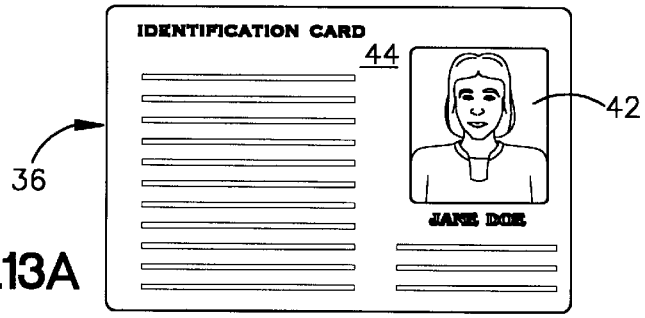
FIG. 13A is a front elevation view of an ID card including a photograph of the card holder.
Figure 13B:
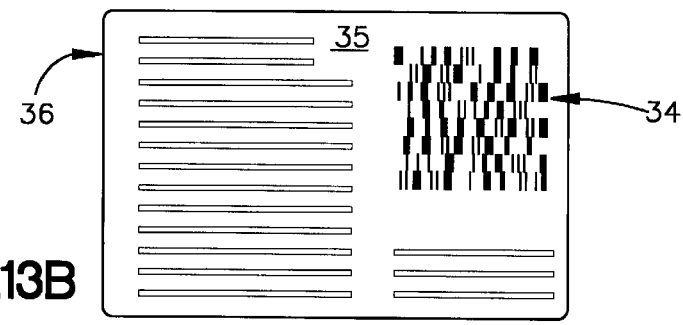
FIG. 13B is a back elevation view of the ID card of FIG. 13A including a 2D stacked bar code dataform on a portion of the back surface of the card.

To better understand the more detailed discussion of the verification apparatus 10 and its operation which follow, a discussion of the use of the apparatus is necessary. To operate the verification apparatus 10, an operator places an identification (ID) card 36, such as that shown in FIGS. 13A and 13B, against the upper surface 22a of the glass window 22. The identification card 36 will typically include a front face 44, having a photograph or picture 42 of the authorized card holder. The back face 35 of the card 36 will include a 2D dataform 34. Encoded in the dataform 34 will be a digitized representation of the photograph 42 on the front face 44. For added security, the digitized data representing the photograph 42 encoded in the dataform may also be encrypted.

When the back face 35 of the ID card 36 is appropriately placed against the glass window upper surface 22a, the camera module 32 captures an image of the dataform 34 and appropriate circuitry decodes, decrypts and displays a digitized image 40 on the display screen 30 (FIG. 1). The operator can verify that the photograph 42 on the ID card front face 44 has not been altered by comparing it to the image 40 on the display screen 30. It should be appreciated that the digitized image 40 does not have to be the same high resolution quality as the photograph 42 because the purpose of the digitized image is not to verify the identify of the card holder, but only to verify that the photograph 42 has not been altered.

Because the digitized representation of the photograph 42 encoded in the 2D bar code dataform 34 is preferably encrypted, it would be quite difficult to generate a "bogus" 2D dataform conforming to a photograph of someone other than the authorized card holder. Specifically, a person seeking to generate a "bogus" 2D dataform would have to: a) digitize the unauthorized user's photograph; b) determine the dataform format or code being used (e.g., a stacked bar code such as PDF-417, Supercode, etc. or a matrix code such as MaxiCode, Data Matrix, Code 1, etc.); c) determine the encryption algorithm; d) apply the encryption algorithm to the digitized representation of the unauthorized user's photograph; e) encode the encrypted data representation of the photograph into the proper 2D dataform format; and f) imprint the 2D dataform on the "bogus" ID card.

Figure 15:
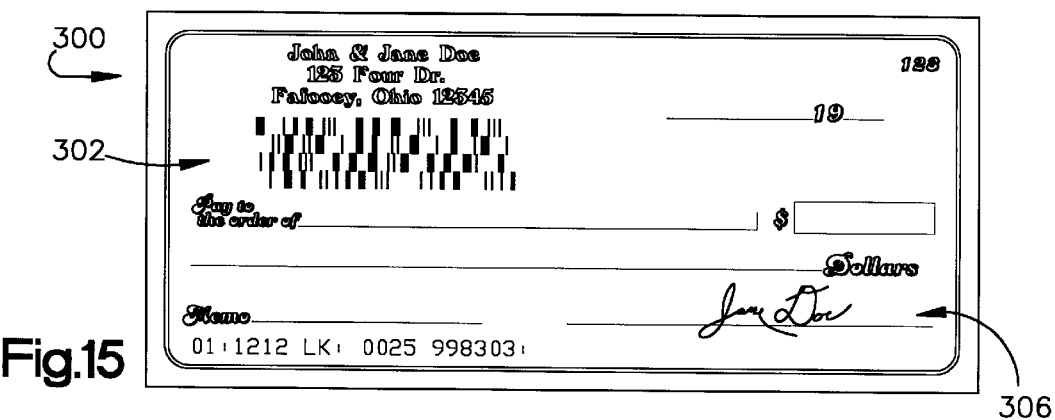
FIG. 15 is a front elevation view of a check including a 2D dataform imprinted on a front of the check, the dataform including an encoded digitized representation of the authorized drawer on the account.
Figure 16A:
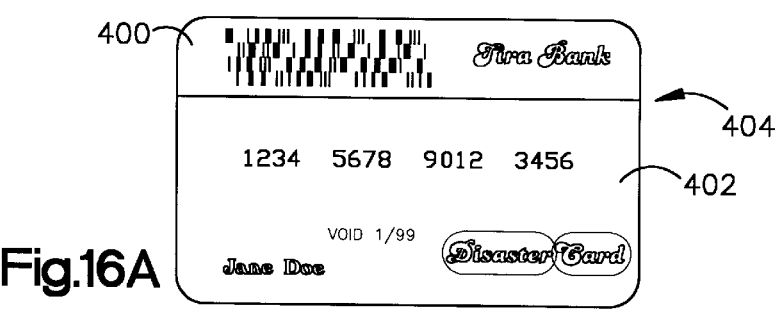
FIG. 16A is a front elevation view of a credit card including a 2D dataform including a 2D dataform imprinted on a front of the credit card, the dataform including an encoded digitized representation of the authorized card holder.
Figure 16B:
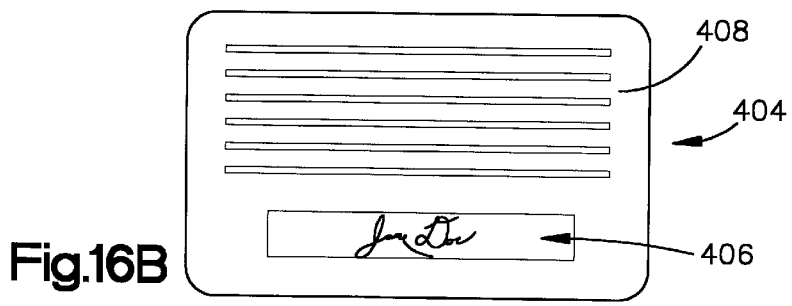
FIG. 16B is a back elevation view of the credit card of FIG. 16A including a signature of the card holder.

Alternatively, when operating the apparatus 10 in the verification mode, an operator may verify the signature of an authorized drawer or signatory on a checking account or the signature of an authorized holder of a credit card. As shown in FIG. 15, a front side of a check 300 includes a 2D dataform 302. The dataform 302 includes an encrypted and encoded representation of a compressed digitized image of a signature or signatures of the authorized signatory or signatories on the checking account. When the check 300 is presented at a bank or other check cashing institution for cashing, a teller places the check face down on the upper surface 22a of the glass window 22. An image of the decoded, unencrypted signature or signatures are displayed on the display screen 30. The decoded signature image is compared with the drawer's signature 306 on a signature line to verify that the signature is legitimate.

In FIG. 15, a 2D dataform 400 is imprinted on a front side 402 of a credit card 404. The dataform 400 includes an encrypted and encoded representation of a compressed digitized image of a signature or signatures of the authorized card holder or holders. When the card 404 is presented to make a purchase, the card is placed on the upper surface 22a of the glass window 22 with the front side 402 down. An image of the decoded, unencrypted signature or signatures of the card holder or holders are displayed on the display screen 30. The decoded signature image is compared both with the signature 406 on the card 404 and with the signature on the purchase receipt (not shown) to verify that the signatures match.

The verification apparatus 10 is typically used to read a series of cards, all of which have the same size, shape and dataform code location and format, e.g., the location size and format of the dataform on the backside 35 of the ID card 36 will be the same for all ID cards. Prior to operating the verification apparatus 10 to read a series of ID cards, it is necessary to adjust the position of the camera module 32 and to focus the optic assembly 52 so that they are properly positioned and focused respectively to capture an acceptable decodeable image of the dataforms on the series of cards. Therefore, the verification apparatus 10 includes a set-up mode to assist an operator in positioning the camera module 32 and focusing the optic assembly 52. Once properly set up, the verification apparatus 10 is used in an operating or verification mode to read dataforms on a series of ID cards.

FIG. 2 is a cross section of the verification apparatus 10 of FIG. 1. It can be seen that the camera module 32 includes a camera assembly 32a, an optic assembly 52 and an illumination assembly 60 supported by a moveable support housing 61. Reflected light from the back side 35 of the ID card 36 including the dataform 34 is focused onto the 2D photosensor array 47 as indicated by focusing lines extending between the optic assembly 52 and the photosensor array 47. Suitable illumination of the ID card dataform 34 positioned on the glass upper surface 22a is provided by the illumination assembly 60 utilizing four sets of illumination light emitting diodes (LEDs) and a spaced apart focusing array. The illumination generated by the illumination assembly 60 is reflected the dataform 34 and focused on the 2D photosensor array 47.

The illumination assembly 60 comprises a printed circuit board 602 which supports a plurality of surface mount LEDs 606. Illumination from each of the LEDs 606 is directed through optical surfaces of a spaced apart lens array 604. Preferably, the printed circuit board 602 includes 16 LEDs 606 arranged into four banks of four LEDs each. A suitable surface mount illumination LED is produced by the Mark-Tech Corporation of Latham, N.Y., as Part No. MTSM735K-UR or MTSM745KA-UR.

The lens array 604 is fabricated from polycarbonate and includes a horizontally aligned cylindrical optic exit surface positioned in front of each bank and a vertically aligned cylindrical optic entry surface positioned in front of each LED 606. The entry and exit surfaces optically interact to generate an illumination intensity distribution pattern which substantially coincides with a field of view of the camera module 32.

Details of a suitable illumination assembly 60 are set forth in U.S. patent application Ser. No. 08/606,619, filed Feb. 26, 1996, entitled "Portable Data Collection Device with LED Targeting and Illumination Assembly". Application Ser. No. 08/606,619 is hereby incorporated in its entirety by reference. A lower surface 22b of the glass window 22 has an anti-reflective coating to reduce internal reflectance off the lower surface 22b.

The camera assembly 32a includes two spaced apart printed circuit boards 62, 63. A two dimensional photosensor array 47 is secured to a front surface of the printed circuit board 62. An optic assembly 52 is positioned to the front of the photosensor array 47 and focuses an image of the target area 54 onto the photosensor array. The optic assembly is supported by a support shroud 70 which, in turn, is secured to the front surface of the printed circuit board 62.

The optics assembly 52 includes a lens assembly comprising a plurality of lenses 62a, 62b, 62d, 62e, 62f supported in a housing 69. The optic assembly 52 focuses an image of the dataform 34 on the 2D photosensor array 47. A thin metal disk 62c with a small central opening is positioned between lenses 62b and 62d. The optics assembly 52 is spaced apart from the 2D photosensor array 47. A suitable optic assembly 54 is available from Marshall Electronics, Inc. of Culver City, Calif. is described in U.S. patent application Ser. No. 08/606,619, filed Feb. 26, 1996, entitled "Portable Data Collection Device with LED Targeting and Illumination Assembly" and referenced above.

As can best be seen in FIG. 2, the support shroud 70 secures the optic assembly 52 at a predetermined position with respect to photosensor array 47 and functions to shroud or block unfocused illumination from the array. The support shroud 70 includes an internally threaded bore into which a correspondingly threaded external circumference of the housing 69 of the optic assembly 52 fits. The threaded arrangement permits the optic assembly 52 to be moved along axis L—L with respect to the photosensor array 47. Rotating the housing 69 of the optic assembly 52 changes the distance between the optic assembly 52 and an image plane which is defined by the position of the photosensor array 47. Correspondingly, movement of the optic assembly 52 also changes an object plane of the optic assembly 52, that is, a distance from a mirror-facing surface of lens 62a at which an object will be best focused onto the photosensor array 47. This enables the optic assembly 52 to be "focused" such that an object placed on the upper surface 22a of the glass window 22 (object plane) is focused as sharply as possible onto the photosensor array 47.

A set screw 85, extending through a threaded opening in the support shroud 70, holds the optic assembly 52 in a fixed position with respect to the support shroud 70 when the screw is tightened. When the set screw 85 is loosened, the housing 69 may be rotated to adjust the position of the optic assembly 52.

Access to the set screw and the optic assembly 52 is provided by pulling back on a side 20a of the bezel 20 which is disconnected from the remainder of the bezel 20. The bezel side 20a is slidable horizontally within a C-shaped upper lip 62 of the housing upper surface 14. Upon retracting the bezel side 20a into the C-Shaped upper lip 62, an upper distal portion of the bezel side 20a no longer overlies the glass window 22 allowing the window to be removed and permitting access to the interior region of the housing 12. When the glass window 22 is in place, the bezel side 20a is biased against the window by a plurality of compressed springs 62a (only one of which can be seen in FIG. 2)

positioned between the C-shaped upper lip 62 and the bezel side 20a to secure the window on the bezel. The other sides of the bezel 20 support the bottom surface 22b of the glass window 22 but do not have upper portions overlying the window thereby permitting the window to be lifted up from the bezel when the bezel side 20a is retracted.

The camera module 32 is supported in a moveable support housing 61 which is moveable with respect to the housing 12 and, in particular, to the glass window upper surface 22a. The adjustability of the moveable support housing 61 permits the field of view of the camera module 32, defined by a viewing angle labeled A (FIG. 2) and corresponding to a target area 54 on the glass window upper surface 22a (FIGS. 1 and 2) to be moved with an area defined by an inner perimeter of the bezel 20.

The moveable support housing 61 permits six-way adjustability of the camera module 32 with three degrees of lateral movement with respect to the housing 12. Three precision adjustment screws 86, 88, 90 (FIGS. 1 and 2) extend through threaded apertures in the housing 12. As can be seen with respect to adjustment screws 86 and 88 in FIG. 2, the distal portions of all three screws 86, 88, 90 abut an outer surface of the movable support housing 61. Extending between, and attached to, the housing 14 and the support 36 are three pairs of biasing springs 86a, 88a, 90a.

The biasing springs 86a, 88a, 90a bias the support housing 61 against their respective precision adjustment screws 86, 88, 90 such that; turning screw 86 moves the camera module 32 along axis L—L (FIG. 2), turning screw 88 moves the camera module 32 along axis H—H (FIG. 2) and turning screw 90 moves the camera module 32 along axis W—W (FIG. 1). It should be recognized that other suitable resiliently deformable components could be used in lieu of or in addition to the springs.

The field of view of the camera module 32, represented by lines 56 defining the angle A in FIG. 1, is directed to the mirror 48 which is orientated at 45 degrees with respect an axis L—L bisecting the field of view of the camera module 32. The mirror 48 is also oriented at 45 degrees to the glass window upper surface 22a. The mirror 48 permits the optic assembly 52 to be disposed parallel to the glass window, that is, axis L—L which bisects the angle A of the field of vision of the optic assembly is substantially parallel to the upper surface 22a of the glass window 22.

It should be appreciated that movement of the camera module 32 along an axis H—H (FIG. 2) will move the target area 54 along a direction C—C (FIG. 1) with respect to the glass window upper surface 22a. Similarly, movement of the camera module 32 along axis W—W (FIG. 1) will move the target area 54 along a direction B—B (FIG. 1) with respect to glass widow upper surface 22a. Finally, movement of the camera module 32 along the axis L—L will lengthen or shorten an optical path between the optic assembly 52 and the glass widow upper surface 22a thereby increasing or decreasing the size of the target area 54.

Figure 14:
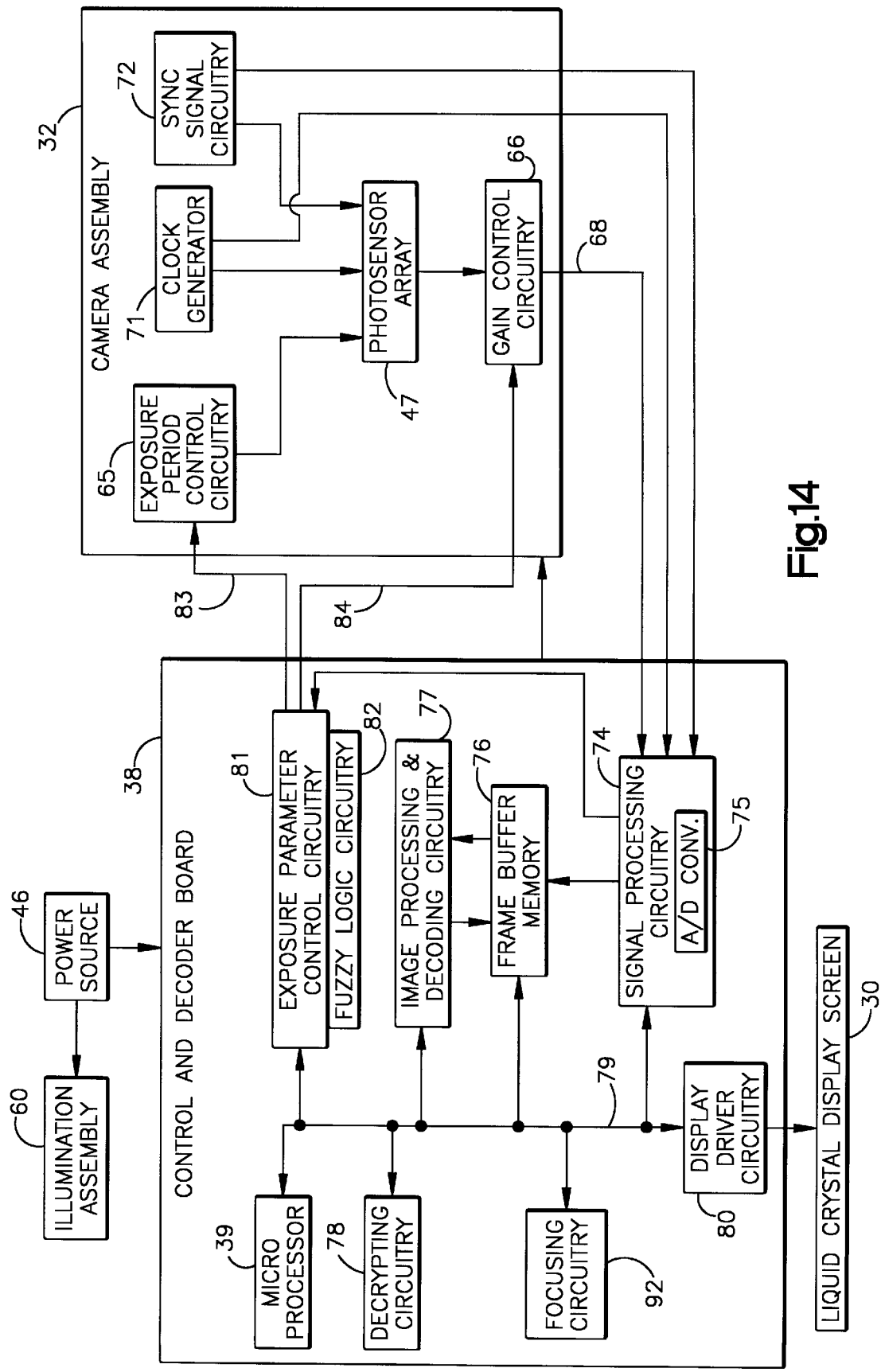
FIG. 14 is a schematic block diagram of selected circuitry of the portable ID card verification apparatus of FIG. 1.

FIG. 14 shows a block diagram of selected circuitry of the verification apparatus 10 of the present invention. The camera assembly 32a includes the photosensor array 47, which in the preferred embodiment is a 752 by 582 matrix array of photodiodes (often referred to as photosensors or pixels), with Phase-Alternation Line (PAL) compatible interlaced read out circuitry.

During an exposure period, each of the photosensors of the photosensor array 47 is charged by illumination incident on the photosensor. The magnitude of the charge accumulated on a given photosensor and read out at the end of an exposure period is dependent on the intensity of illumination incident on the photosensor during the exposure period. A clock generator 71 and synchronization signal generator circuitry 72 function in conjunction with photosensor array 47 to generate a PAL compatible composite video signal 68. The control and decoder board 38 includes exposure parameter control circuitry 81 (which may in part be operated by microprocessor 39) and includes fuzzy logic control circuitry 82 which operate in conjunction with exposure period control circuitry 65 and gain control circuitry 66 supported on the camera assembly 32a for controlling the duration of the exposure period and the amplification of the video signal 68.

The control and decoder board 38 also includes signal processing circuitry 74, including A/D converter 75, for receiving the output composite video signal 68 and generating a sequence of gray scale values, each representative of a read out magnitude of illumination incident on a pixel. A frame buffer memory 76 stores a set of gray scale values representing a captured frame of image data.

A more detailed description of these circuits is included in U.S. patent application Ser. No. 08/560,063, filed Dec. 20, 1995 and entitled "Portable Data Collection Device with Two Dimensional Imaging Assembly". Application Ser. No. 08/560,063 is assigned to the same assignee as the present invention and is incorporated herein in its entirety by reference.

The control and decoder board 38 also includes image processing and decoding circuitry 77 for decoding a 2D dataform represented in a captured frame of image data, decrypting circuitry 78 for decrypting decoded data if the dataform data was encrypted, display driver circuitry 80 and focusing circuitry 92 for assisting the operator in focusing the optic assembly 52. Each of these circuit assemblies may be at least in part embodied in code executed by the microprocessor 39.

As stated previously, prior to using the verification apparatus 10 in the verification mode, the apparatus is operated in the set up mode. The focusing circuitry 92 assists the operator in adjusting the position of the camera module 32 and focusing the optic assembly 52 such that a perimeter of the target area of the camera modules corresponds to a perimeter of dataforms on a series of ID cards to be verified and such that the best focus object plane corresponds to the glass window upper surface 22a where the ID cards will be placed for verification. Because the verification apparatus 10 will typically be used to read a series of ID cards, all of which have the same size, shape and dataform location and format. The position of the camera module 32 and focus of the optic assembly 52 will be set to optimal positions and then remain stationary.

When operating in the set up mode, the focusing circuitry 92 and microprocessor 39 will cause the display driver circuitry 80 to display an image of the target area 54 captured by the camera assembly 32a to be displayed on the display screen 30. Such a display is diagrammatically depicted in FIG. 3. The card 36 is positioned on the glass window upper surface against a corner of the bezel 20 such that the dataform 34 on the back side 35 is most centrally located as possible on the glass window 22. Hatch marks 94 are positioned on the display screen 30 to indicate the perimeter of the target area 54 which is defined by field of view of the camera module. This assists the operator in adjusting the position of the camera module 32 along each of the three movement axis L—L, H—H, W—W such that the perimeter of the target area 54 corresponds to the perimeter of an image 90 of the dataform.

Figure 3:
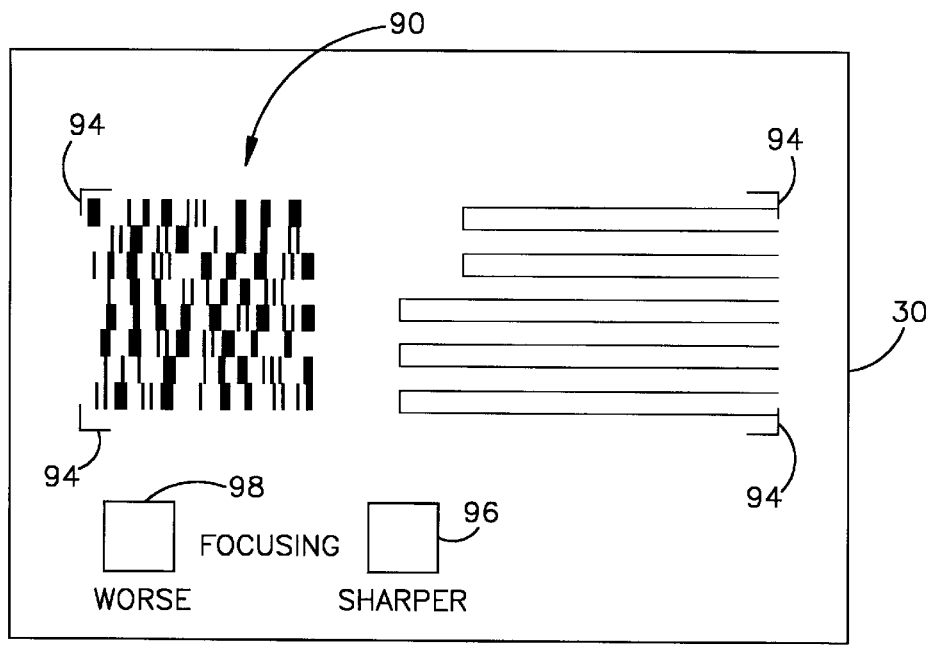
FIG. 3 is a schematic representation of a display screen of the portable ID card verification apparatus of FIG. 1.

A focus assist system controlled by the focusing circuitry 92 and the microprocessor 39 is also employed in the set up mode to aid an operator properly adjust the optics assembly 52 to focus a sharp image of the dataform 34 onto the photosensor array 47. As can be seen in FIG. 3, a portion 96 of the display screen 30 marked "sharper" will illuminate as a prompt when the operator is turning the optics assembly housing 69 within the support shroud 70 in a direction in which the dataform image 90 focused onto the photosensor array 47 is progressively getting sharper or having increased resolution, that is, the alternating dark lines and white spaces comprising the dataform image 90 are becoming more distinct and less blurred because the focus of the optics assembly 52 of light reflected from the dataform onto the 2D photosensor array 47 is becoming sharper. A portion 98 of the display screen 30 marked "worse" will illuminate as a prompt when the operator's rotation of the optics assembly housing 69 within the support shroud 70 causes the image 90 to become less sharp or have decreased resolution, that is, the bars and spaces comprising image are becoming less distinct and more blurred because the focus of the optics assembly 52 of light reflected from the dataforms onto the 2D photosensor array 47 is becoming less sharp.

FIGS. 5A and 5B illustrate a "blurred" and "sharp" focusing of the dataform image 90 on the photosensor array 47. Only a portion of the dataform image 90 is shown for ease of illustration. In FIG. 5A, the optics assembly 52 is improperly positioned with respect to a dataform portion such that an image 200 of the dataform portion projected onto a portion of the photosensor array 47 is blurred.

The intensity of light incident on individual pixels or photosensors of the photosensor array portion varies somewhat uniformly from very bright (whitest areas of the image) to very dark (darkest areas of the image). As noted above, the preferred 2D photosensor array 47 comprises an interlaced 752 by 582 matrix array of photodiode photosensors or image pixels (for a total of 437,664 pixels). The clock generator 71 (FIG. 14) is coupled to a crystal oscillator and generates a synchronous clocking signals to read out charges accumulating on individual photosensors over an exposure period. The charges on the photosensors are read out through CCD elements adjacent the photosensor array photosensors, one CCD element is provided for reading out the charges on two photosensors thus two read outs of the photosensor array comprise one full image frame, the frame being comprised of two interlaced fields. A magnitude of charge on an individual photosensor is dependent on an intensity of light incident on the photosensor over an exposure period. Synchronization signals are generated by synchronization signal circuitry 72 to provide synchronization signals which correlate portions of the video signal to particular photosensors. A read out of all photosensors in the array generates signal representative of a field of an image projected on the photosensor array 47. As noted above, two interlaced fields (i.e., two successive read outs of the photosensor array 38) comprise one full frame of the image. The camera assembly 32 generates the composite analog video signal 68 (FIG. 14) corresponding to consecutive fields of the image incident on the photosensor array 47. The video signal 68 is termed "composite" because it includes synchronization signals generated by the synchronization signal circuitry 72 interspersed among voltage signal portions wherein the signal magnitudes represents charges on individual photosensors read out from a given row of the photosensor array 47.

The analog video signal 68 is electrically coupled to the control and decoder board 38 via a lead 73 (FIG. 2). Under the control of the microprocessor 39, the composite analog video signal 68 is input to the signal processing circuitry 74 along with clocking signals and synchronization signals from the clock generator 71 and the synchronization signal circuitry 72. The output analog video signal 68 is digitized by the analog to digital converter (A/D converter) 75 and the digitized signal is converted to a series of gray scale values, one gray scale value for each pixel position. A gray scale is a scale representing a range between complete black and complete white, e.g., zero being complete black and 255 being complete white (of course, other scale ranges could be used or converted to). The magnitude of a portion of the output signal 68 corresponding to one pixel represents the intensity of illumination incident on the pixel during an exposure period. Gray scale values associated with a captured image frame are determined by the signal processing circuitry 74 and stored in the frame buffer memory 76.

Decoding circuitry 77 mounted on the control and decoder board 38 decodes the imaged 2D dataform 34. If the 2D dataform 34 was encrypted prior to encoding, deencrypting circuitry 78 is utilized by the microprocessor 39. The deencrypting circuitry 78 applies the encrypting algorithm used in encoding the dataform 34 in reverse to convert the decoded data extracted from the dataform to unencrypted, decoded data. The decoded, unencrypted data corresponding to a digital representation of the card holder attribute or attributes (i.e., the photograph 42) encoded in the dataform 34 is sent via a data, address and control bus 79 to display driver circuitry 80. The display driver circuitry 80 formats the data and transmits the data to the liquid crystal display screen 30 where the data is displayed as the image 40 (FIG. 1).

Assuming that the gray scale value of a pixel varies in magnitude between a value of zero (corresponding to no or very low illumination intensity incident on a given pixel over an exposure period) to a value of 255 (corresponding to very bright illumination intensity incident on a given pixel over an exposure period) and that a gray scale value is calculated for each of the 437,664 pixels of the photosensor array 47, a representative histogram 202, 206 may be plotted for each of the images 200, 204 of FIGS. 5A and 5B. The histograms 202, 206 are bar graphs with each possible gray scale value plotted on the horizontal axis and the number of pixels with a particular gray scale value forming a height of the individual bars. For the blurry image 200, the histogram 202 is characterized by a somewhat uniformly distributed plot across the gray scale values from zero to 255.

In FIG. 5B, the optic assembly 52 is properly positioned with respect to the dataform 34 such that an image 204 of a dataform projected on a portion of the photosensor array 47 and, therefore, on the display screen 30 is sharp. The histogram 206 plotting the quantity of pixels corresponding to each gray scale value will ideally correspond to a step function. That is, the pixels will either have a gray scale value near zero (very low illumination intensity corresponding to a dark bar reflected from the dataform and focused onto the pixel) or a value near 255 (very high illumination intensity corresponding to a white space of the dataform reflected from the dataform and focused onto the pixel). Relatively few pixels will have gray scale values near the middle of the gray scale.

Figure 4:
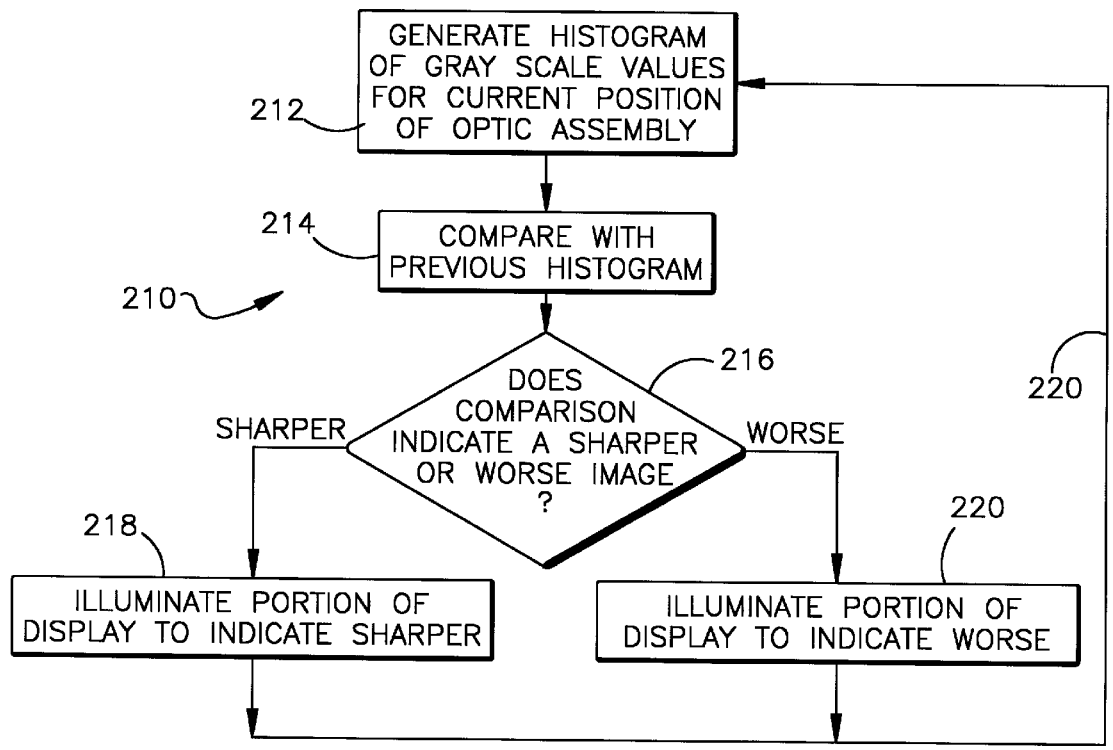
FIG. 4 is a schematic block diagram of a focus assist system of the portable ID card verification apparatus of FIG. 1.

FIG. 4 is a flow chart 210 illustrating operation of the focus assist system. At step 212, the focusing circuitry 92 and microprocessor 39 generate a histogram of gray scale values corresponding to a current position of the optics assembly 52. The data for the histogram is extracted from the frame buffer memory which includes gray scale values for each pixel of the photosensor array 47 associated with the most recently captured image frame. The histogram plots a plurality of adjacent ranges of gray scale values versus the number of pixels falling into each range (similar to the representative histograms 200, 204 of FIGS. 5A, 5B).

The histogram may comprise a sample of pixel gray scale values of the photosensor array corresponding to a captured image frame or include all of gray scale values for the captured frame. As noted previously, the gray scale values for a captured image frame are generated by the signal processing circuitry 74 and stored in the frame buffer memory 76. The focusing circuitry 92 extracts either all of the gray scale values or a portion of the gray scale values from the most recently captured frame from the frame buffer memory 76 and generates the histogram.

At step 214, the focusing circuitry 92 compares the histogram plot associated with the most recently captured image frame to a previous histogram plot, that is, a histogram plot associated with an some earlier position of the optics assembly 42. At step 216, the focusing circuitry 92 determines whether the current position of the optics assembly 52 corresponds to a sharper or worse image than the optics assembly position associated with the previous histogram. If the new histogram is characterized by more sharply sloped upward edges as compared to the previous histogram (more like histogram 206 of FIG. 5B), then the image 200 at the current position of the optics assembly 52 is sharper than the image 200 at the previous position of the optics assembly. Thus, the movement of the optics assembly 52 from the previous position to the current position has resulted in more occurrences of low gray scale values and extremely dark gray scale values. At step 218, the focusing circuitry 92 causes the "sharper" display indicator to illuminate informing the operator that he or she is improving the image 200 on the display screen 30.

If, on the other hand, the current histogram is characterized by less sharply sloped upward edges than the previous histogram, then the image 200 is getting less sharp (more like the histogram 202 of FIG. 5A). Thus, at step 220, the focusing circuitry 92 will cause the "worse" display indicator to illuminate. As indicated by the loop 222, the focus assist system continues to generate histograms of successive captured image frames and illuminate the appropriate indicator "sharper" or "worse" until the operator stops adjusting the optics assembly 34 for a predetermined period of time.

After the verification apparatus 10 is set up, it is used to verify attribute data in a verification mode as discussed previously. Because a digitized and compressed image of the photograph 42 of the authorized card holder contains a large amount of data, the 2D dataform 34 may be large and quite dense.

Figure 6:
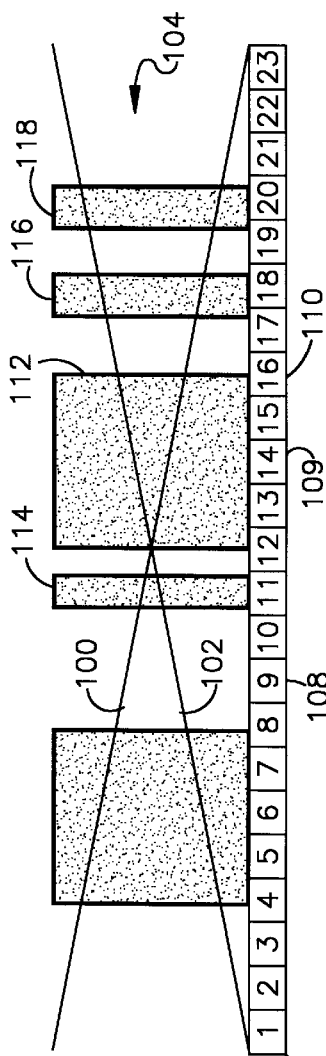
FIG. 6 is schematic diagram showing a representative portion of a bar code data and corresponding pixel positions from a portion of one row of a photosensor array.

To further improve the ability of the verification apparatus 16 to read dense dataforms, the imaging circuitry 32 includes sub pixel processing capabilities which are useful for reading bar code dataform wherein the smallest element (bar or space) of the dataform images onto fewer than two pixels. For example, bar 114 of a dataform portion 104 in FIG. 6 is imaged onto only pixel position 11. The microprocessor 39 performs sub-pixel image processing and decoding as depicted in FIGS. 6–12.

A representative portion of a row 104 of a bar code dataform is shown in FIG. 6. The image of the row portion 104 is processed by analyzing one or more of sampling lines such as shown in 100 and 102 that extend at oblique angles through the row portion 104 of the dataform wherein each of the sampling lines 100, 102 is represented by a sequence of gray scale values stored for each of the pixels in an image frame along the line.

Figure 7:
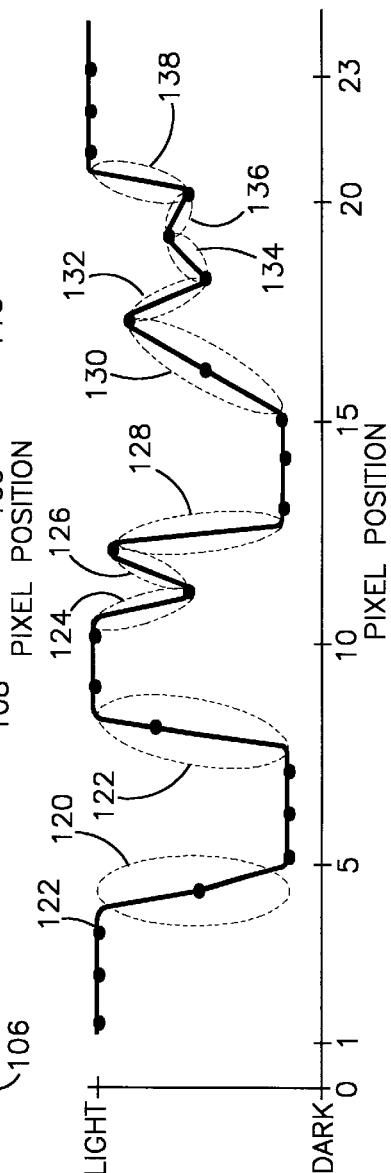
FIG. 7 is a representative graph of pixel positions for a portion of one row of the photosensor array versus a signal representative of gray scale value.

For purposes of illustration, FIG. 7 shows a simple sequence of the row comprising bars and spaces of the bar code dataform and an adjacent representation of a line of pixel positions 106, or alternatively, charge coupled device (CCD) sensor element positions through which the sample line 102 extends. It will thus be appreciated that a pixel position 9, labeled 108, receives illumination reflected from a high reflectance white region of the bar code dataform row portion 104, while a pixel position 14, labeled 109, receives illumination reflected from a low reflectance bar or black region. A pixel position 16, labeled 110, receives an intermediate level of illumination from a region including portion of a bar and a portion of a space, that is, a black/white region representing an edge transition 112. When digitized and stored in the frame buffer memory 76 as gray scale values, the pixel position 9 is represented by a high gray scale value (near 255), the pixel position 14 is represented as a low gray scale value and the pixel position 16 is represented as an intermediate gray scale value (around 122 or about half way between zero and 255).

FIG. 7 shows an ideal plot of an output signal representative of gray scale value for each pixel position of the dataform row portion 104 of FIG. 6 without noise, that is, without ambient illumination from sources other than light reflected from the dataform striking the photosensor array 47 and without noise variations in the array. The pixel position output signal voltage magnitudes are proportional to the pixel gray scale values and those terms will be used interchangeably throughout this discussion. The FIG. 7 plot requires sub-pixel processing because, as shown, the smallest bars 114, 116, 118 are narrower than two pixels in width. In FIG. 6, each edge transition represents a transition from black to white (bar to space) or white to black (space to bar).

In FIG. 7, each edge transition is represented by a transition segment (illustrated as a line segment) transitioning from a higher gray scale value (white) to a lower gray scale value (black), for example, the circled line segment labeled 120, or a transition segment transitioning from a lower gray scale value to a higher gray scale value, for example, the circled line segment 122. In addition to transitions from black to white and white to black, there are included transition segments between higher and lower intermediate gray scale values (e.g., gray to gray), for example, the circled line segments labeled 126, 132, 134, 136. Finally, there are transition segments between intermediate gray scale values and higher gray scale values (white), for example, the circled line segment 124, 138 and transition segments between intermediate gray scale values and lower gray scale values (black), for example, the circled line segments 128, 130.

Each transition segment 120, 122, 124, 126, 128, 130, 132, 134, 136, 138 can be considered as extending between a local maximum and local minimum. Use of the term "local" is due to the fact that the maximum or the minimum for a given transition segment may represent an intermediate gray scale value less than the highest gray scale value corresponding to white or greater than the lowest gray scale value corresponding to black). The local maximum and local minimum represents adjacent peak and trough gray scale values and can be in a peak to trough sequence, or vice versa. In FIG. 7, in the absence of noise, each of the 10 transition segments 120, 122, 124, 126, 128, 130, 132, 136, 138 represents a valid edge transition. As illustrated, each high reflectance space plots as a peak and each low reflectance bar plots as a trough.

Certain characteristics of the gray scale peaks and troughs (maximum and minimum gray scale values) are particularly significant as follows. If a space is large enough to cover several pixel positions, the peak is wide and flattens at the white gray scale value. Similarly, a wide bar is represented by a wide flat-bottomed trough at the black gray scale value. If a space is narrower than two pixels wide, then the peak will be narrower than two pixels. More specifically, for narrower spaces the height of the peak may only reach an intermediate gray scale value rather than a white value, as noted.

Figure 8:
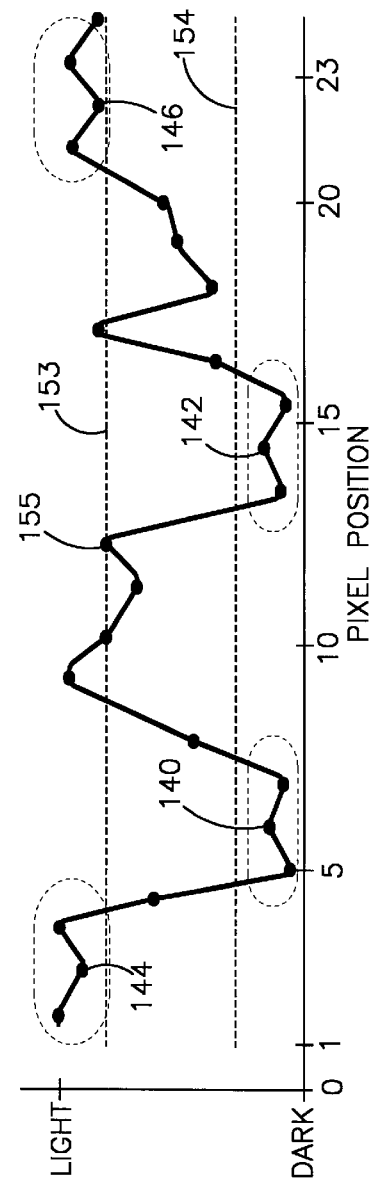
FIG. 8 is a representative graph of pixel positions for a portion of one row of the photosensor array versus a signal representative of gray scale value as shown in FIG. 7 with noise introduced.

In FIG. 8, random noise has been introduced to the FIG. 7 plot producing a gray scale plot including nineteen transition segments. Since FIG. 7 includes only ten edge transitions 120, 122, 124, 126, 128, 130, 132, 134, 136, 138, the FIG. 8 transition segments in excess of that number are "false" transition segments. However, the following additional characteristics can be recognized. First, if a peak (or trough) is more than two pixels wide, there are pixel positions along the top of the peak (or bottom of the trough) whose gray scale value can be changed by noise to result in introduction of false peaks or troughs, or both. In FIG. 8, noise has resulted in false peaks labeled 140, 142 at pixel positions 6 and 14. Second, if a peak (or trough) is two pixels or less in width, noise can distort the maximum (or minimum) gray scale value but cannot add a new peak or trough. Because transition segments representative of edge transitions are represented by line segments between successive local maximum and local minimum gray scale values (or vice versa), for peaks or troughs two pixels or less in width noise cannot result in the addition of a new transition segment. Also, if there are a series of bars and spaces each one two pixels wide, each bar and space will plot as a single peak or trough, regardless of the presence of noise or the magnitude of such noise.

Thus, false transition segments produced by noise can only be present within high and low ranges of gray scale values. Accordingly, a noise margin is employed so that small transition segments present in such high and low gray scale ranges are treated as not representing actual edge transitions. The noise margin is not applied to small transition segments where a peak or trough is present in the intermediate gray scale region (i.e., between the high and low ranges). Since noise cannot create false transition segments outside of the high and low gray scale ranges, each transition segment in the intermediate gray scale region is considered an information bearing transition representing an edge transition. High and low gray scale ranges for this purpose may be designated on a predetermined or trial and error basis for use with codes of a particular type (e.g., having known characteristics). The ranges may also be actively determined by histogram analysis. In FIG. 8 the high range may also be considered as extending from pure white to the gray scale value represented by line 153, with the low range from black to the line 154 gray scale value. With these ranges, a noise margin is effective to cause the transition segments emanating from the noise-modified gray scale values 140 and 142 (as respective false local minimum and maximum values) to be treated as false segments, without restricting transition segment 155 from being processed as representing an actual edge transition.

Figure 10:
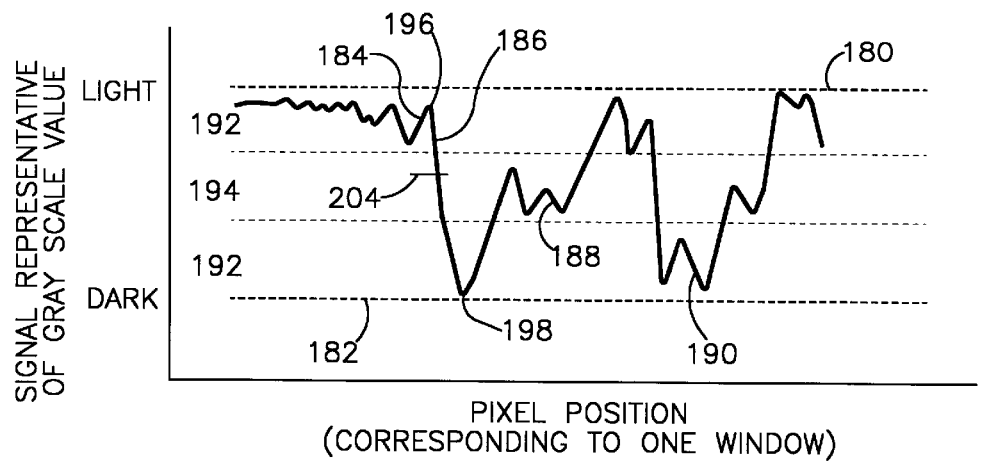
FIG. 10 is a representative graph of pixel positions for one imaging window of the photosensor array versus a signal representative of gray scale value.
Figure 11:
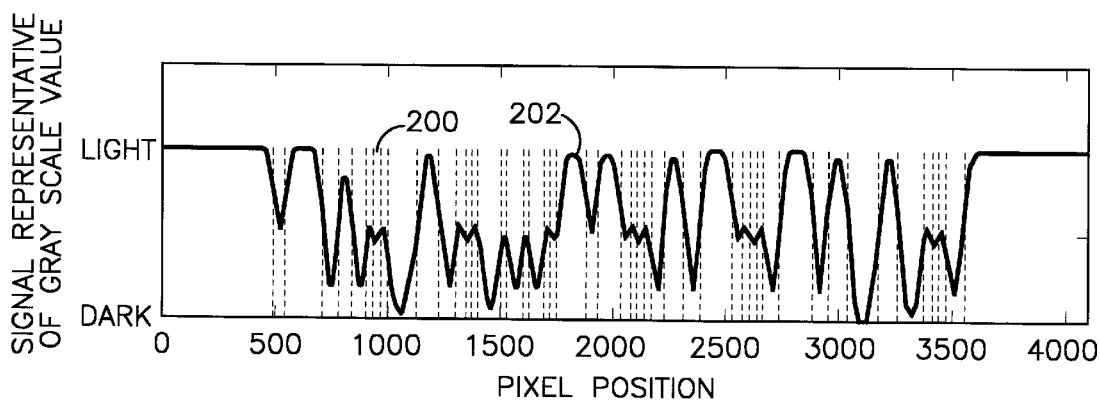
FIG. 11 is a representative graph of a sample of selected pixel positions versus a signal representative of gray scale value.

FIG. 11 is a flow chart that depicts a dataform code edge transition location method for sub-pixel processing of an image of the field of view of the camera module 32. First, a frame image including the dataform 16 is stored by the microprocessor 39 at block 160 and a noise margin is determined at block 162. A sampling line 100, 102 of gray scale values is then extracted from the stored image data at block 164 by the microprocessor 39. At block 168, the upper and lower envelope borders are estimated by the microprocessor 39 and updated for the sequence of gray scale values for the sampling line just extracted. FIG. 10 represents a portion of the gray scale value sequence on a horizontally expanded scale. In this example, the portion is one of a series of window portions comprising the full sequence. As shown, the upper and lower envelop borders are indicated at 180 and 182. Preferably, a window portion is selected to include gray scale values for a limited number of bars and/or space of the dataform code. In this manner, the sampling line will comprise a series of window portions with envelope borders determined individually for each window portion. As a result the envelope borders are dynamically determined for successive windows, providing high resolution.

It is noted that a change in the level of reflected illumination representing a black and white, or white and black, edge will result in a change in gray scale values along a sampling line. FIG. 11 shows a sequence of gray scale values connected by transition segments, representative examples of which are identified at 184, 186, 188 and 190. As already discussed, it has been found that for bars of a small dimension in the presence of noise, small transition segments may represent either actual edge transitions or false edge transitions, that is, spurious gray level variations attributable to noise effects. Thus, transition segment 186 is large enough not to be attributable to noise. However, transition segments such as those shown in 184, 186 and 190 have a small magnitude comparable to the magnitude of spurious effects attributable to noise. High resolution decoding can be achieved by utilizing a noise margin as discussed above to characterize small transition segments occurring at relatively high or low gray scale values as attributable to noise. The noise margin is, however, selectively utilized so that while transition segments such as 184 and 190 are treated as false, transition segments such as 186 and 188 are treated as valid and processed in order to locate edge transitions.

Figure 9:
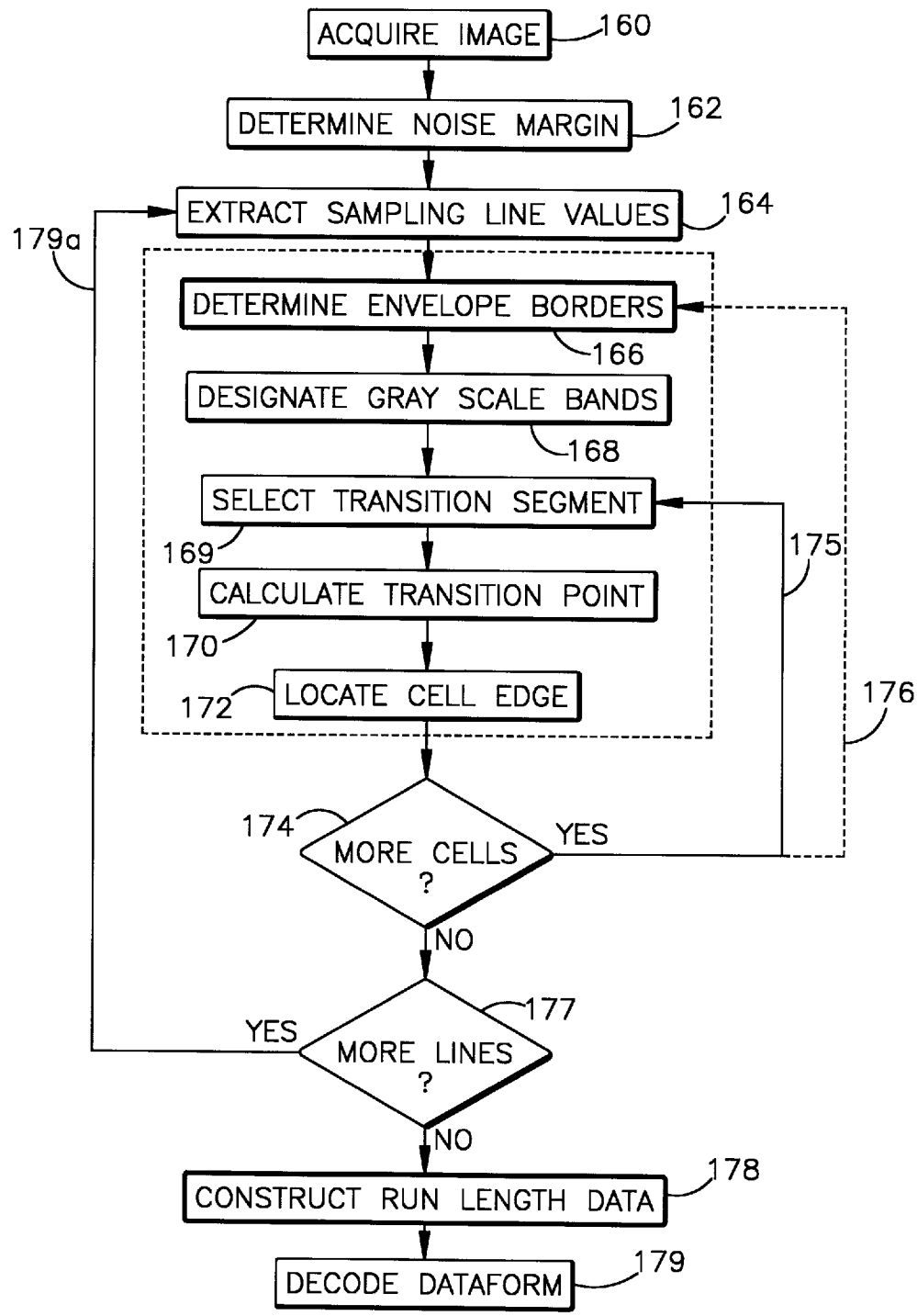
FIG. 9 is a block diagram of a sub-pixel imaging process for the portable ID card verification apparatus of FIG. 1.

More particularly, for the individual window portion of FIG. 10, at block 166 of FIG. 9, the noise margin is implemented by the microprocessor 39 dividing the gray scale range between the upper and lower envelop borders into three horizontal bands. For example, a ratio of 2 to 1 may be used with each of the outer bands 192 twice as wide as the central band 194. With this ratio the width of bands 192 will each be 40 percent and band 194 will be 20 percent of the overall width between the upper and lower envelope borders 180 and 182. As a result, as the width (i.e., range of gray scale values) between the envelope borders change for different window portions of a sampling line, the widths of the bands 192 and 194 will be dynamically adjusted for each window section during sub-pixel processing. Thus at block 168 transition segments such as 184 and 190 which fall within the upper and lower bands 192 are subject to the noise margin and are discarded by the microprocessor 39 as spurious effects if the transition segment magnitude falls below the noise margin. Transition segments such as 186 which have a magnitude greater than the noise margin are treated by the microprocessor as representative of actual edge transitions, as are segments such as 188 that are contained within the central band 194. Thus, transition segments falling within one of the outer bands 192 are treated as spurious if they fall below the noise margin, but transition segments falling within central band 194 are processed, regardless of magnitude.

At block 169, a first transition segment extending between two successive gray scale values is selected by the microprocessor, subject to the block 168 noise margin as implemented in the context of outer bands 192, as discussed above. Thus, the transition segment 186 may be selected by the microprocessor 60 for purposes of block 169. As shown, the transition segment 186 extends between gray scale end point values labeled 196, 198, that may respectively be referred to as local maximum and local minimum values.

At block 170, the adaptive transition point is determined along transition segment 186 as a function to its end point gray scale maximum and minimum values labeled 196, 198. The adaptive transition point represents the location of the relevant edge transition relative to the inclined length of the transition segment. In accordance with the invention, during sub-pixel processing an adaptive transition point is calculated for each transition segment selected as representative of an edge transition. In a currently preferred embodiment, the adaptive transition point for each edge transition is calculated based upon a Gaussian convolution model. The gray scale pixel values along a sampling line can be modeled as the samples of an input signal with step edges passing a linear system with a Gaussian impulse response. In FIG. 11, an example of the input and output of a particular sampling line is illustrated, with the Gaussian convolution kernel width (typically designated σ) set at 1.1. pixels and the bar code module width (minimum bar width) set at 1.5 pixels. The input signal 200 (dashed lines) results in the output 202 (solid line) upon application of the Gaussian convolution model utilizing known techniques. Application of the Gaussian convolution model may also use integrated or point sampling techniques to obtain the output in a form similar to that shown in FIG. 11. The Gaussian convolution model accounts for convolution of the optic assembly 52 and photosensor array 47, with the model assimilating these components into processing of the gray scale pixel values along the sampling line. For a transition segment representing a valid edge transition, the adaptive transition point in a preferred embodiment may be calculated using the following relationship that fits the Gaussian model:

$$a=8+10*[(MAX+MIN)-(U+L)]/(U-L)$$

$$T=a*MIN+(16-a)* MAX$$

Where MAX is the local maximum value, MIN is the local minimum value, U is the upper envelope border value, L is the lower envelope border value, and T is the transition point.

With reference to FIG. 10 the local maximum and minimum values for transition segment 186 are indicated at 196, 198 with the adaptive transition point shown at 204. For a range of convolution kernel widths and bar code module widths of interest, this transition point can be fit into a linear function of the local maximum 196 and local minimum 198 for a single edge, and the minimum and maximum of the output of the dataform elements having the greatest width. In general, the separation width between a pair of rising and falling transition segments representing edges in wider bar code patters is much larger than the convolution kernel width. The minimum and maximum of the response relative to wide bar code patterns are thus the upper and lower envelope borders of the signal wave form of the sequence of gray scale values.

The Gaussian convolution model uses the middle point between the relevant upper and lower envelope borders of the signal envelope and the maximum/minimum gray scale values (196, 198 for transition segment 186) as input parameters. As noted in FIG. 11, the transition point as determined for transition segment 186 is represented at point 204 along the segment between points 196, 198. As thus determined, threshold 204 will typically not be at the midpoint between points 196, 198. In this manner, dynamic transition point determination is provided by calculating a transition point for each transition segment selected as representing an edge transition.

Figure 12:
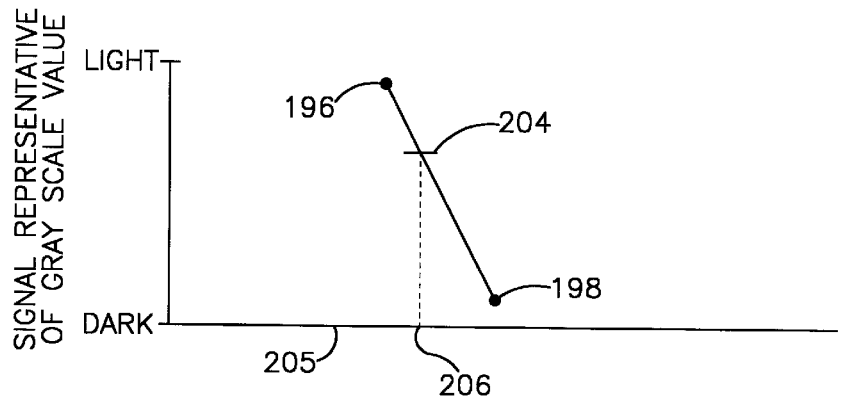
FIG. 12 is a representative graph of two selected pixel positions of FIG. 10 versus a signal representative of gray scale value.

After determination of the adaptive transition point for transition segment 186, at block 172 the relevant edge is located by the microprocessor 39. A line interpolation is used as illustrated in FIG. 12. Thus, the first edge transition in this example is located along the sampling line (represented by line 205 in FIG. 12) at position 206 corresponding to the point of intersection of the vertical projection of transition point 204 with line 205. As discussed, 196, 198 represent a sampling line across the bar code dataform image. Point 206 thus indicates that location of the first edge transition processed in this example.

At block 174, the determination is then made by the microprocessor 60 as to whether there are additional edge transitions to be located along the first sampling line. If so, steps 169 and 172 are repeated (by activation via path 175) for each remaining edge transition to be located along this sampling line. If additional edge transitions remain to be located, it will be apparent from the description above that the next such edge transition may be represented by a transition segment between gray scale values which lie along the sampling line at pixel positions beyond the particular window section represented in FIG. 10. If so, in going to the next window section, action will be implemented, via path 176, to newly determine envelope borders and designate gray scale bands for purposes of noise margin implementation at blocks 177, 178 and 179, as described below. It will be understood that in some applications it may be adequate to determine envelope borders once for a complete sampling line, without implementation of a series of window sections.

At block 177, the microprocessor 39 determines whether edge transitions are to be located with reference to a second sampling line across the bar code dataform image. If so, blocks 164 through 170 are repeated (by activation via path 179a) for each remaining sampling line.

At block 178 run length data is constructed to represent edge transition of the bar code. Run length data may be in the form of a series of numerical values representing the widths of the elements. At block 179 the run length data is utilized to decode the dataform using standard decoder software for the chosen bar code dataform format.

The present invention has been described with a degree of particularity, but it is the intent that the invention include all modifications from the disclosed preferred design failing within the spirit or scope of the appended claims.

We claim:

1. A portable verification apparatus for reading a dataform imprinted on an ID card, the dataform including an encoded, digitized representation of an attribute of an authorized user of the card, the apparatus comprising:

a) a housing defining an interior region and supporting electronic circuitry including a processor;

b) a substantially transparent window supported by the housing and being accessible from an exterior of the housing, the window providing a support surface upon which the ID card is placed, the card's dataform being visible through the window;

c) an imaging assembly coupled to the electronic circuitry and including a camera assembly including a 2D photosensor array supported within the housing and an optics assembly spaced from the 2D photosensor array to focus an image of the dataform onto the 2D photosensor array;

d) decoding circuitry for decoding the dataform imaged onto the photosensor array;

e) a display screen electrically coupled to the electronic circuitry for displaying a decoded representation of the attribute of the authorized user of the card; and f) a mirror positioned between the substantially transparent window and the optics assembly and the optics assembly being positioned such that a longitudinal axis bisecting a field of view of the optics assembly is substantially parallel to a plane defined by a support surface of the substantially transparent window.

2. The verification apparatus of claim 1 wherein the 2D photosensor array and the optics assembly are supported by a movable support which is selectively movable along the longitudinal axis of the optics assembly and along two other axis which are both substantially normal to the longitudinal axis.

3. The verification apparatus of claim 1 wherein the optics assembly includes an outer housing which is threaded into a support shroud overlying the 2D photosensor array, the optics assembly being movable with respect to the photosensor array by rotating the optics assembly housing with respect to the support shroud.

4. The verification apparatus of claim 3 wherein the apparatus further includes focusing circuitry which displays the dataform on the display screen and illuminates a user visible indicator signal on the display screen indicating an sharper image if a user is rotating the optics assembly housing in a direction that improves a resolution of the image of the dataform onto the 2D photosensor array and illuminates a user visible indicator signal on the display screen indicated a worse image if a user is rotating the optics assembly housing in a direction that reduces the resolution of the image of the dataform onto the 2D photosensor array.

* * * * *